US006969170B1

(12) United States Patent
Smith

(10) Patent No.: US 6,969,170 B1
(45) Date of Patent: Nov. 29, 2005

(54) AUXILIARY LENS ASSEMBLY WITH SPRING-LOADED ATTACHMENT TO PRIMARY LENS ASSEMBLY

(76) Inventor: Greg Smith, 3913 Wood Lake, Plano, TX (US) 75093

( * ) Notice: Subject to any disclaimer, the term of this patent is extended or adjusted under 35 U.S.C. 154(b) by 16 days.

(21) Appl. No.: 10/920,019

(22) Filed: Aug. 17, 2004

(51) Int. Cl.[7] ............................................ G02C 9/00
(52) U.S. Cl. ................................... 351/47; 351/57
(58) Field of Search ............................ 351/47, 48, 57, 351/58, 44, 41

(56) References Cited

U.S. PATENT DOCUMENTS

| 3,238,005 | A | 3/1966 | Petitto |
| 3,252,747 | A | 5/1966 | Robins |
| 4,070,103 | A | 1/1978 | Meeker |
| 5,376,977 | A | 12/1994 | Liu |
| 5,416,537 | A | 5/1995 | Sadler |
| 5,568,207 | A | 10/1996 | Chao |
| 5,737,054 | A | 4/1998 | Chao |
| 6,089,708 | A | 7/2000 | Ku |
| 6,474,811 | B2 | 11/2002 | Liu |
| 6,601,953 | B1 | 8/2003 | Xiao |
| 6,820,976 | B2 * | 11/2004 | Ifergan ........................ 351/47 |

* cited by examiner

*Primary Examiner*—Hung Xuan Dang
(74) *Attorney, Agent, or Firm*—Storm LLP; John G. Fischer

(57) ABSTRACT

An eyewear assembly comprises a primary lens assembly that includes a primary frame that secures a pair of primary lenses in position relative to one another and a pair of primary extensions, each positioned on an outer periphery of the primary frame. Each of a pair of arms, is connected to one of the primary extensions by a hinge. An auxiliary lens assembly includes an auxiliary frame that secures a pair of auxiliary lenses in position relative to one another and a pair of auxiliary extensions, each positioned on an outer periphery of the auxiliary frame. A lug is carried on each of the primary extensions and moveable on and relative to the extension, each lug adapted to receive a portion of one of the pair of auxiliary extensions, wherein the auxiliary lens assembly is removably secured to the primary lens assembly and the auxiliary lens assembly moves with the lugs.

8 Claims, 9 Drawing Sheets

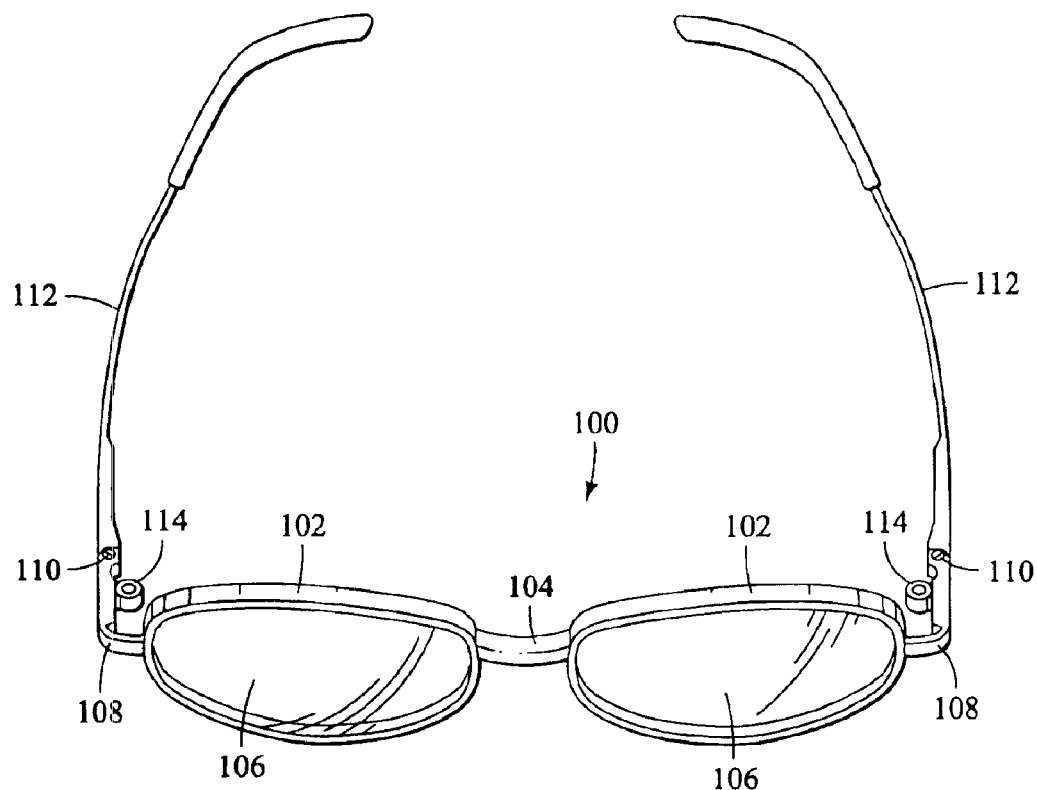
FIG. 2
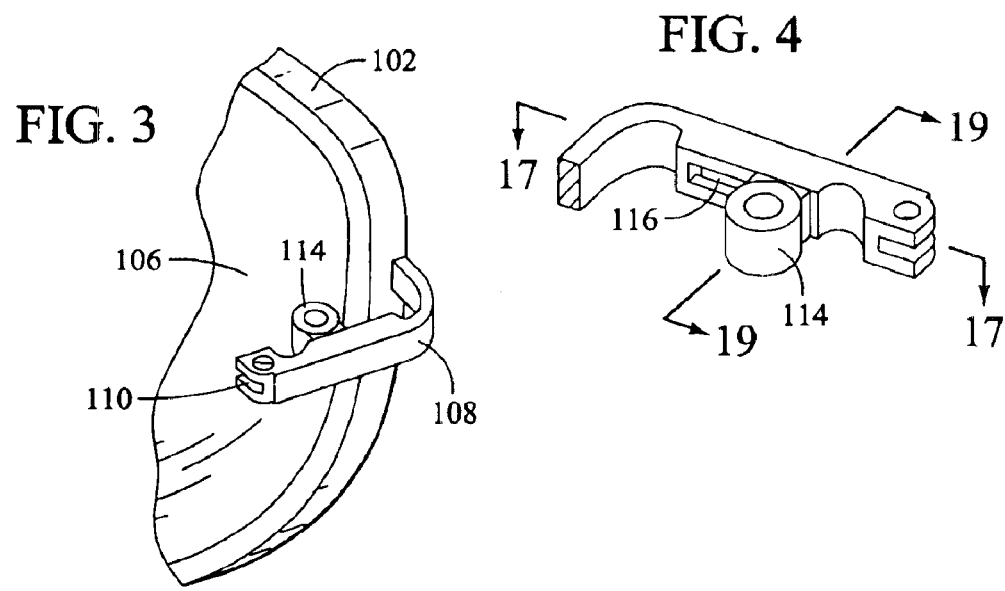
FIG. 3
FIG. 4

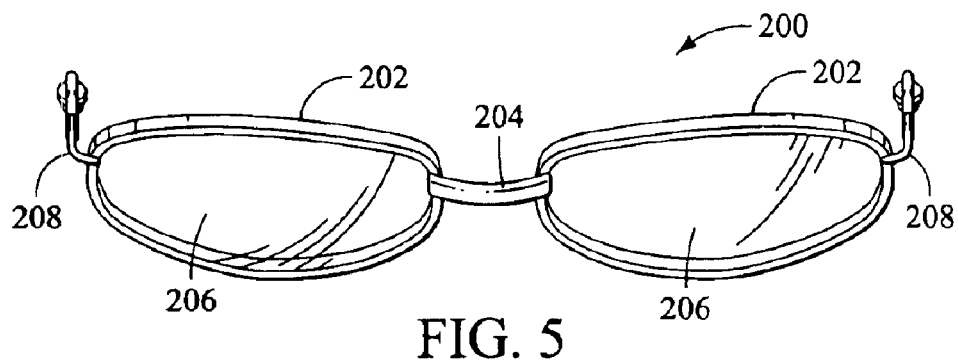
FIG. 5
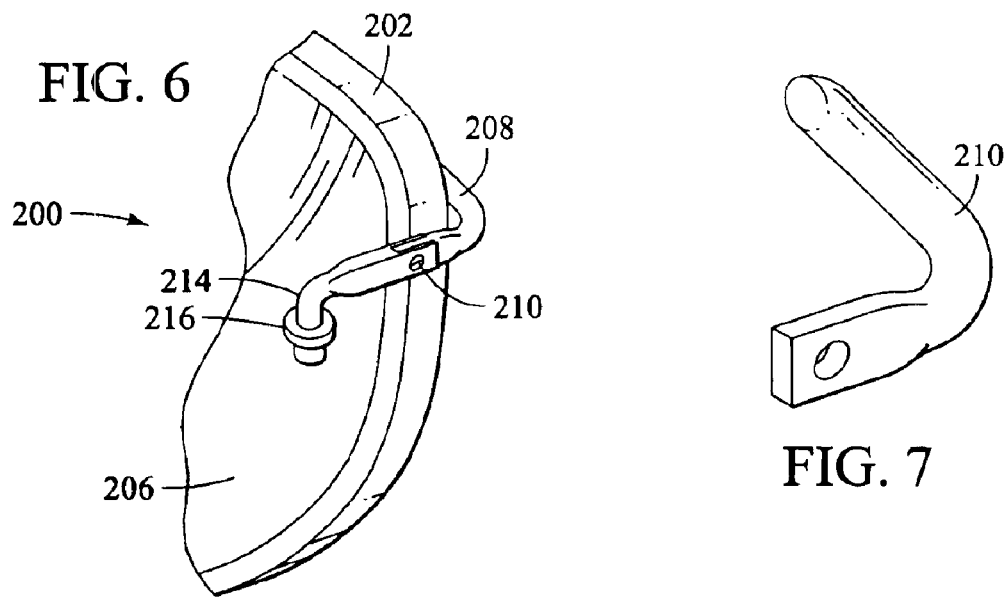
FIG. 6
FIG. 7
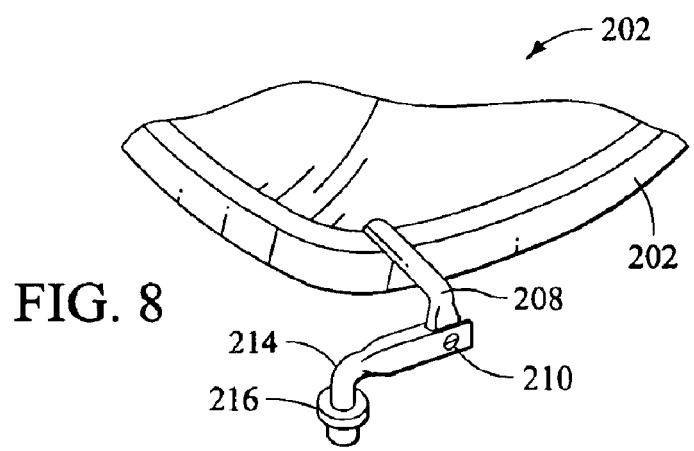
FIG. 8

FIG. 17
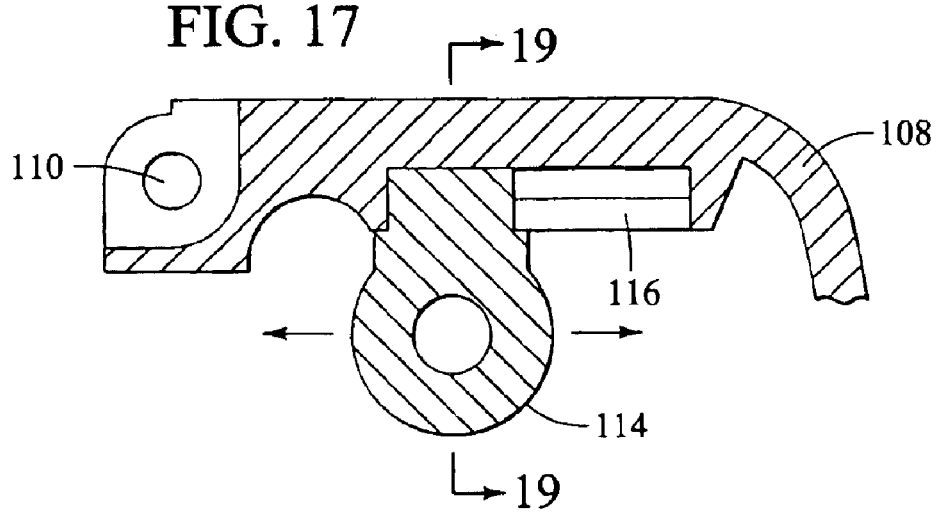
FIG. 18
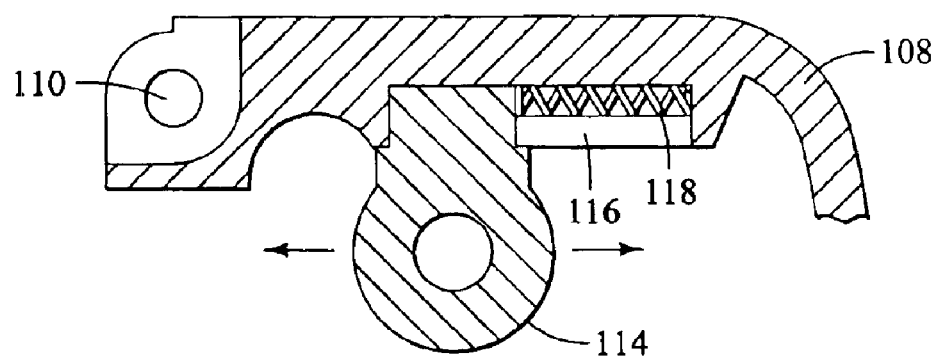
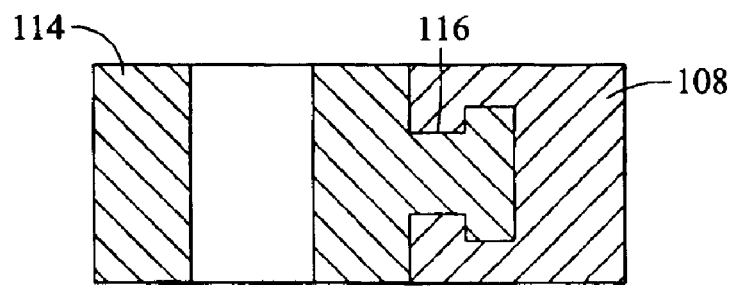
FIG. 19

US 6,969,170 B1

AUXILIARY LENS ASSEMBLY WITH SPRING-LOADED ATTACHMENT TO PRIMARY LENS ASSEMBLY

TECHNICAL FIELD OF INVENTION

The present invention relates to eyewear, and in particular, to auxiliary frame and lens assemblies for eyewear. More particularly, the present invention relates to the means for removably securing the auxiliary lens and frame assembly to the primary lens and frame assembly.

BACKGROUND OF THE INVENTION

It has long been desirable to have a removable auxiliary lens assembly attached to eyeglasses. Often, these auxiliary lens assemblies are hinged to rotate between raised and lowered positions. Professional baseball players have used these "flip-up" auxiliary lenses for more than four decades to protect their eyes from the sun, but to allow them unrestricted vision in the event the ball was hit in their vicinity without the necessity of removing the auxiliary lens assembly from the primary assembly altogether. These "flip-up" lenses are attached by a hinged mechanism to the primary lens assembly so that they can be raised and lowered or moved between an "up" position, away from the primary lenses, and a "down" position, where the auxiliary lenses cover or overlap the primary lenses.

Various means have been provided for attaching a flip-up or hinged auxiliary lens assembly to a primary lens assembly. Typically, the means of attachment between the primary and auxiliary lens assembly is either complex and difficult and expensive to manufacture, or flimsy (and easily manufactured). One problem is that the attachment point must be carefully selected at the design stage so that the auxiliary lenses can "flip-up": the auxiliary lens assembly must be able to clear the primary lens assembly when it its rotated between the up and down or raised and lowered positions. This need is not addressed by the prior art.

A need exists, therefore, for improved means for attachment of hinged auxiliary lens assemblies to primary lens assemblies that is both robust in its attachment, yet easily manufactured and permits breadth in design characteristics.

SUMMARY OF INVENTION

A primary advantage of the present invention is that it provides an eyewear assembly with safety shields that is adapted to receive auxiliary lens assemblies.

In accordance with one aspect of the invention, an eyewear assembly comprises a primary lens assembly that includes a primary frame that secures a pair of primary lenses in position relative to one another and a pair of primary extensions, each positioned on an outer periphery of the primary frame. Each of a pair of arms is connected to one of the primary extensions by a hinge. An auxiliary lens assembly includes an auxiliary frame that secures a pair of auxiliary lenses in position relative to one another and a pair of auxiliary extensions, each positioned on an outer periphery of the auxiliary frame. A lug is carried on each of the primary extensions and movable on and relative to the extension, each lug adapted to receive a portion of one of the pair of auxiliary extensions, wherein the auxiliary lens assembly is removably secured to the primary lens assembly and the auxiliary lens assembly moves with the lugs.

According to one aspect of the present invention, the lug is secured by a tongue and groove to each of the primary extensions and is movable a selected distance toward and away from the primary lens.

According to another aspect of the present invention, the primary lenses are corrective lenses.

According to one aspect of the present invention, a biasing member in the form of a coil spring is disposed between the lug and the primary extension to urge the lug toward the primary lens.

Other advantages of the present invention will become apparent from the following descriptions, taken in connection with the accompanying drawings, wherein, by way of illustration and example, an embodiment of the present invention is disclosed. As referred to herein, the "present invention" refers to one or more embodiments of the present invention which may or may not be claimed, and such references are not intended to limit the language of the claims, or to be used to construe the claims in a limiting manner.

BRIEF DESCRIPTION OF THE DRAWINGS

FIG. 2 is an isometric view of the eyewear assembly according to the preferred embodiment of the present invention, showing only the primary lens assembly.

FIG. 3 is an enlarged view of a portion of the primary lens assembly of FIGS. 1 and 2.

FIG. 4 is a further enlarged, partial view of a portion of the primary lens assembly shown in FIG. 3.

FIG. 5 is an isometric view of the eyewear assembly according to the preferred embodiment of the present invention, showing only the auxiliary lens assembly.

FIG. 6 is an enlarged view of a portion of the auxiliary lens assembly of FIGS. 1 and 5.

FIG. 7 is an enlarged view of a portion of the auxiliary lens assembly shown in FIG. 6.

FIG. 8 is an enlarged view of a portion of the auxiliary lens assembly of shown in FIG. 6 illustrating the auxiliary lens assembly in the raised position.

FIG. 17 is an enlarged section view of the primary frame extension of the primary frame assembly, taken along section line 17—17 of FIG. 4.

FIG. 18 is an enlarged section view of the primary frame extension of the primary frame assembly.

FIG. 19 is an enlarged section view of the primary frame extension of the primary frame assembly, taken along section line 19—19 of FIG. 18.

DETAILED DESCRIPTION OF THE INVENTION

Figure 1:
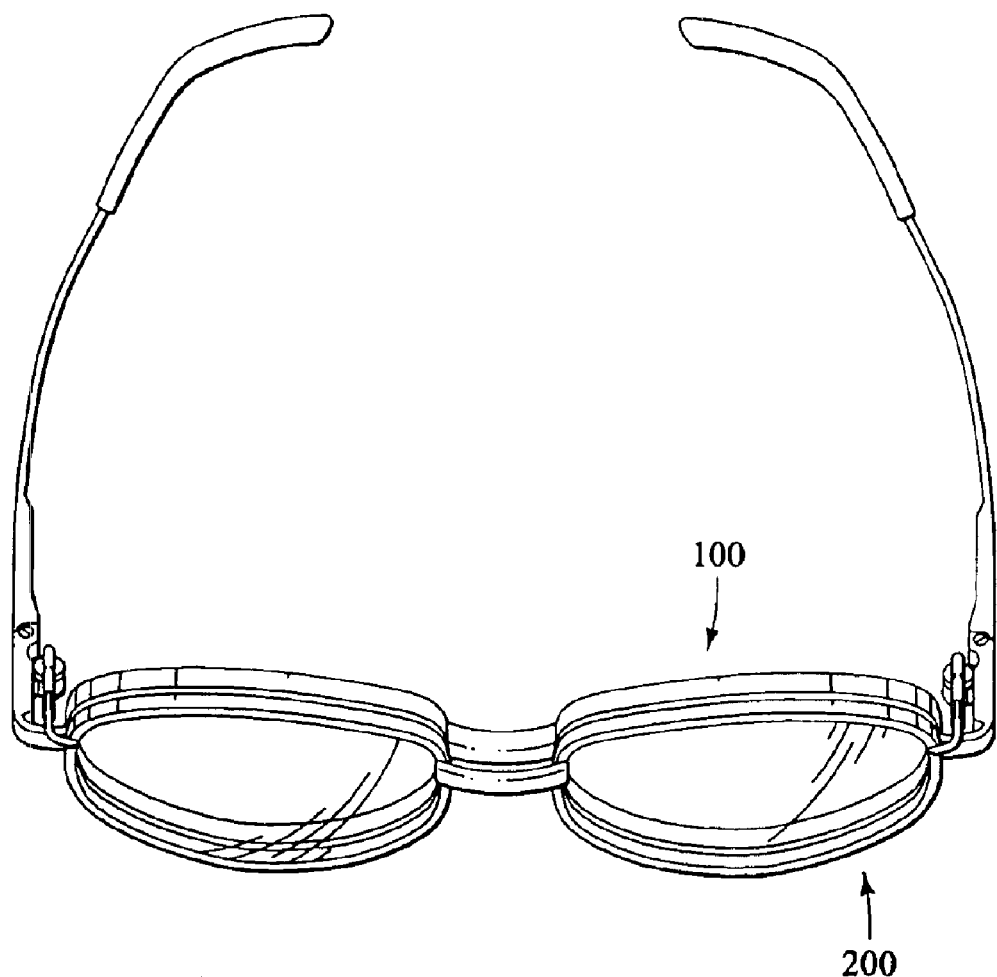
FIG. 1 is an isometric view of the eyewear assembly according to the preferred embodiment of the present invention including both the primary and auxiliary lens assemblies.
Figure 9:
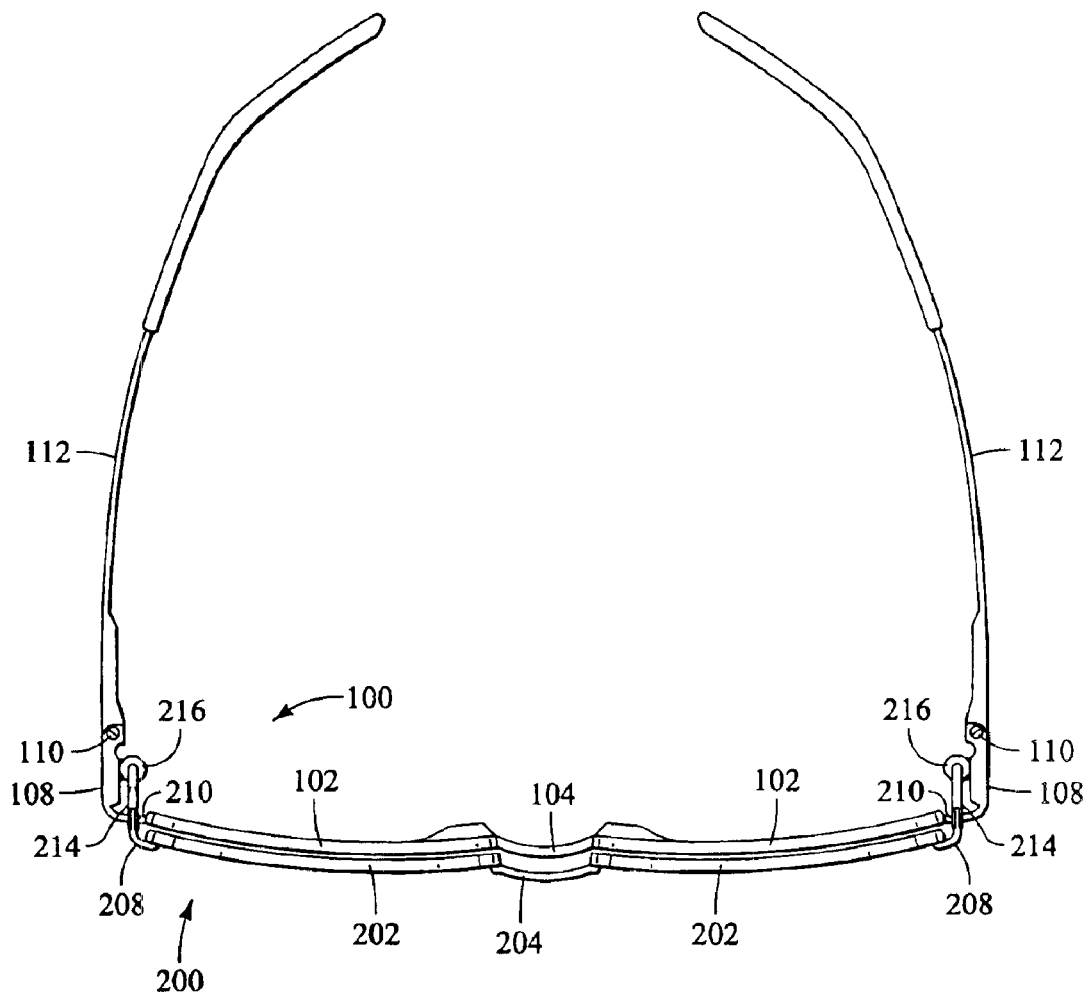
FIG. 9 is a plan view of the eyewear assembly according to the preferred embodiment of the present invention including both the primary and auxiliary lens assemblies.
Figure 10:
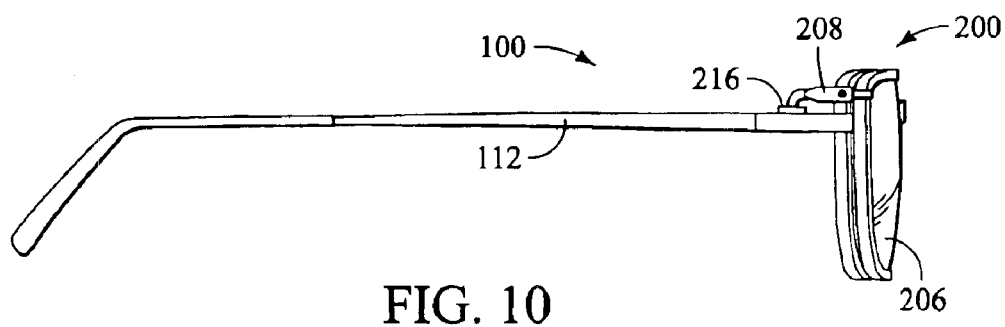
FIG. 10 is a side view of the eyewear assembly of FIG. 9.
Figure 11:
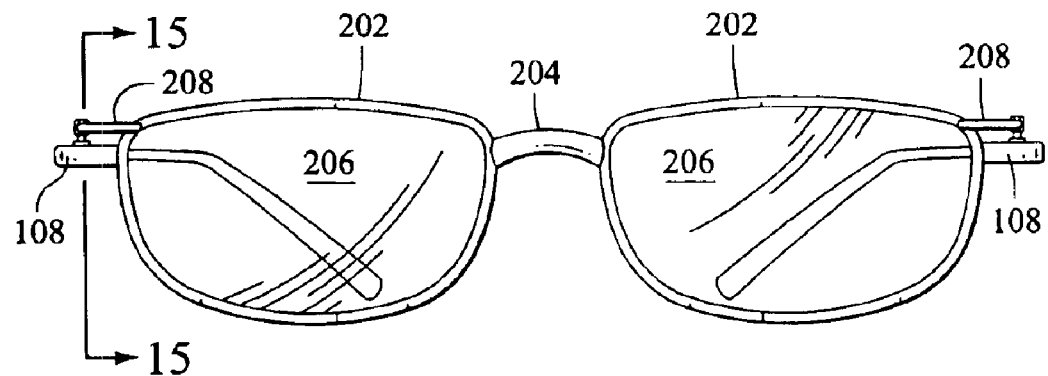
FIG. 11 is an elevation view of the assembled primary and auxiliary lens assemblies illustrating the auxiliary lens assembly in the lowered position.
Figure 12:
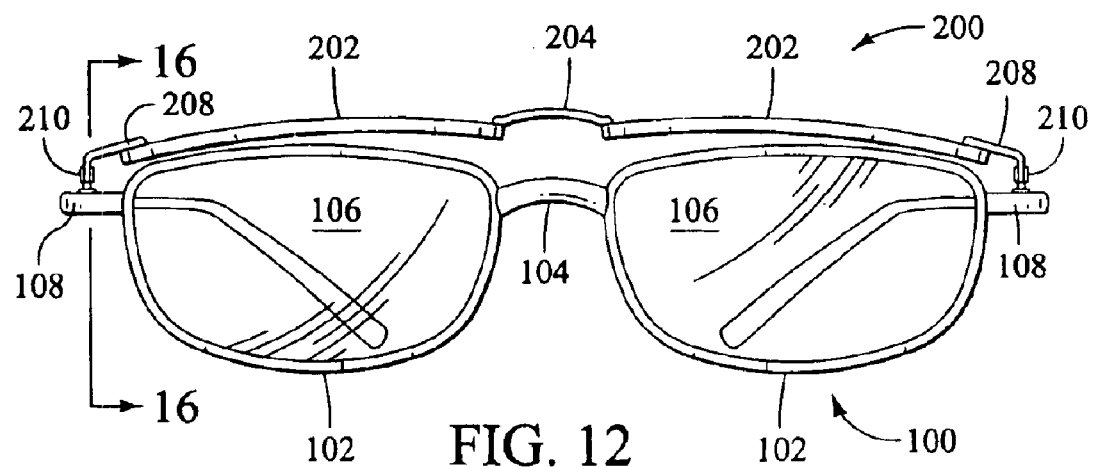
FIG. 12 is an elevation view of the assembled primary and auxiliary lens assemblies illustrating the auxiliary lens assembly in the raised position.
Figure 13:
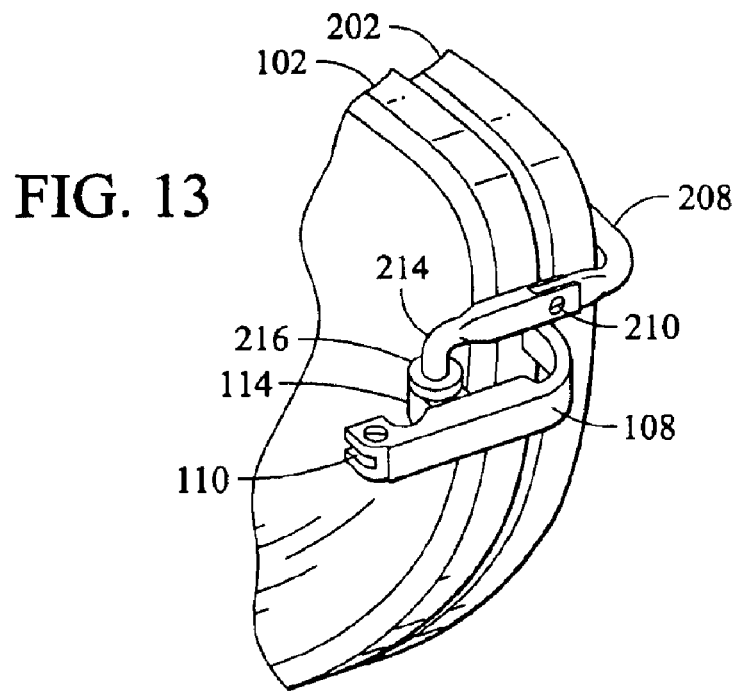
FIG. 13 is an enlarged view of a portion of the attachment point between the primary and auxiliary lens assemblies of FIGS. 1 through 12.

Referring now to the FIGURES and particularly to FIG. 1, an eyewear assembly 100, 200 according to the present invention is shown. As illustrated in FIGS. 1 and 2, the eyewear assembly comprises a primary lens assembly 100 to which is removably attached an auxiliary lens assembly 200. Primary lens assembly has a primary frame 102. A bridge 104 connects the right and left portions of primary frame 102, each of which holds a primary lens 106, which may be a protective lens, corrective lens, or colored lens. At the outer periphery of each lens, each end of frame 102 has an extension 108.

A hinge 110 connects an arm or temple 112 is connected to each extension 108. Each arm 112 terminates in an earpiece (shown in FIGS. 1 and 2). Primary frame 102, bridge 104, extensions 108, and arms 112 cooperate to locate eyewear assembly 100 on the face of the wearer and to locate lenses 106 relative to one another and to the wearer's eyes.

As shown in FIG. 3, an auxiliary assembly mounting lug 114 is carried by extension 108 on each side or end of frame 102. As shown in FIG. 4 and disclosed in greater detail below, mounting lug 114 is secured to extension 108 by a tongue-and-groove mechanism 116 that permits lug 114 to slide or translate along the length of groove 116. An aperture or hole is formed in lug 114 to receive a portion of auxiliary lens assembly 200, as described below.

FIG. 5 illustrates auxiliary frame and lens assembly 200, which, like primary assembly 100, includes a frame of two sections 202, connected by a bridge 204, that holds a pair of auxiliary lenses 206. A pair of auxiliary extensions 208 are provided at the outer periphery of each end of frame 202. FIGS. 6 through 8 show auxiliary extensions 208 in greater detail. Extension 208 is of conventional heavy-gauge wire construction and is connected to frame 202 by welding, soldering or the like. It terminates in a rectangular portion (FIG. 7) with an aperture, which defines a hinge 210 in cooperation with hinge extension 214 and a screw or pin. Hinge extension 214 is also formed of wire material and has a downturned end with a flange 216 recessed some distance from the end. The function of flange 216 is described in greater detail below. As shown by FIGS. 6 and 8, hinge 210 permits auxiliary frame assembly to rotate between lowered (FIG. 6) and raised (FIG. 8) positions.

FIGS. 9 through 12 are plan and elevation views showing auxiliary assembly 200 secured to primary assembly 100 and shows the relationship between many of the parts thereof. The relative positions of the components between the raised (FIG. 12) and lowered (FIGS. 9, 10, and 11) positions of auxiliary assembly 200 relative to primary assembly 100 are shown. Specifically, the general alignment between auxiliary 208 and primary 108 extensions, is illustrated. Further, the registry between hinge extension 214, flange 216 and lug 114, described in greater detail below, is illustrated. It is this registry or connection that removably secures auxiliary assembly 200 to primary assembly 100.

Figure 14:
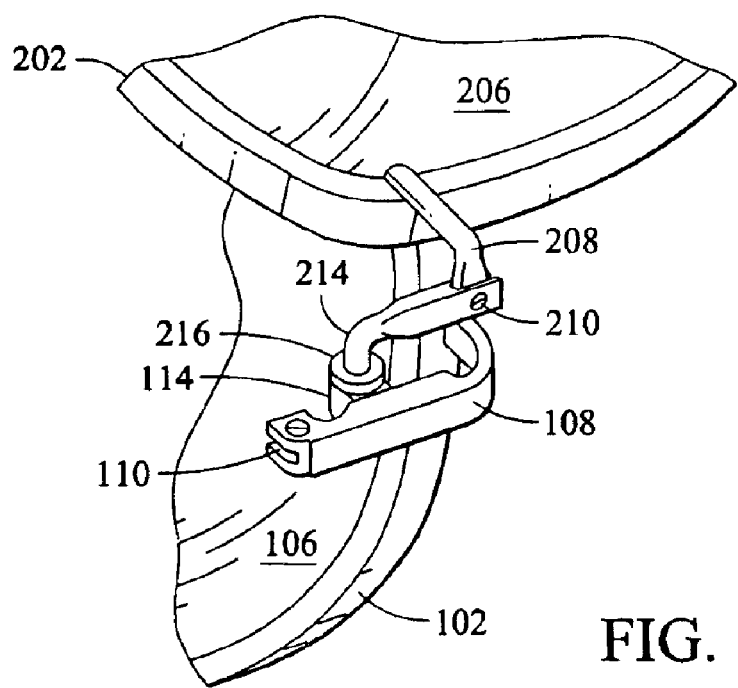
FIG. 14 is is an enlarged view of a portion of the attachment point between the primary and auxiliary lens assembly of FIG. 13, showing the auxiliary lens assembly in the raised position.
Figure 15:
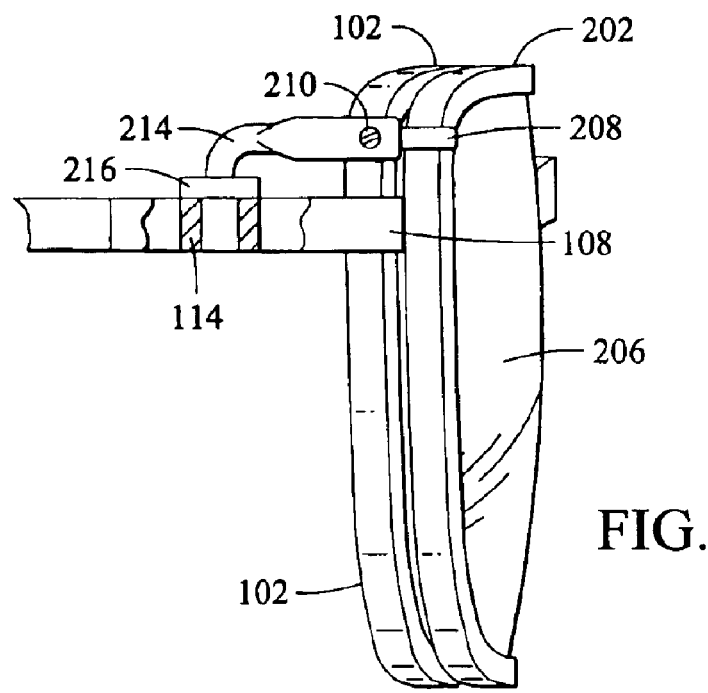
FIG. 15 is an elevation view, partially in section along the line 15—15 in FIG. 11, of the attachment point between the primary and auxiliary lens assemblies.
Figure 16:
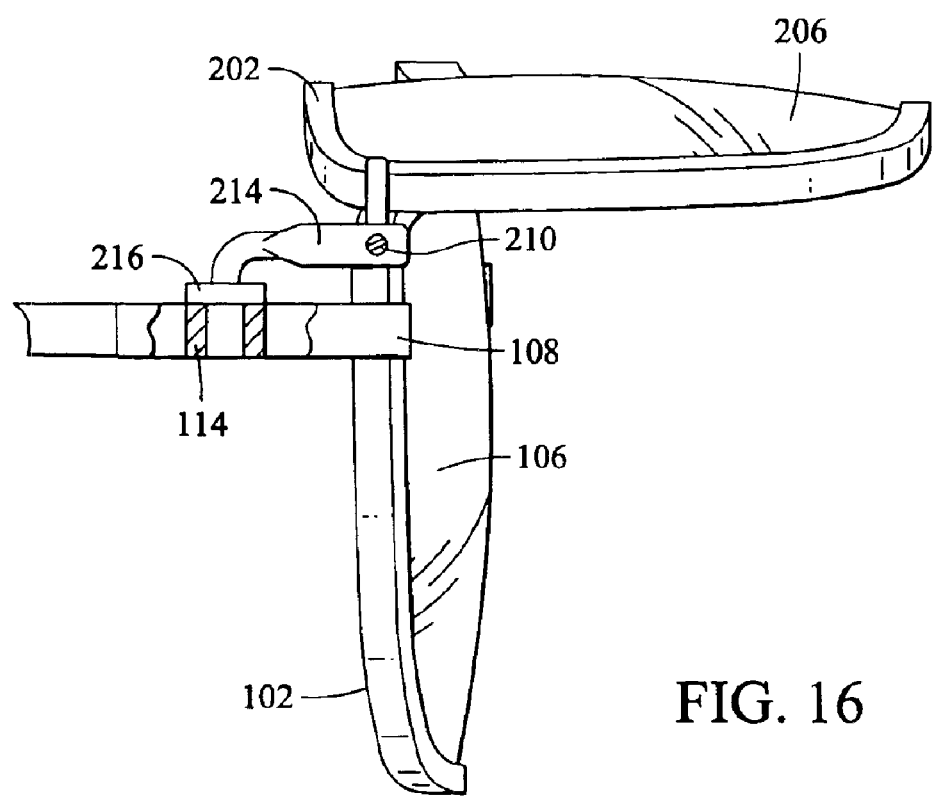
FIG. 16 is an elevation view, partially in section along the line 16—16 in FIG. 12, of the attachment point between the primary and auxiliary lens assemblies.

FIGS. 13 through 16 are enlarged views depicting the registry between the end of hinge extension 214, its associated flange 216, and lug 114 on extension 108. As can be seen flange 216 prevents the end of hinge extension 214 from penetrating too deeply into the aperture in lug 114. Accordingly, flange 216 should be placed a distance from the end of hinge extension 114 corresponding to the depth of the aperture in lug 114. FIGS. 14 and 16 show auxiliary assembly 200 in the raised position relative to primary assembly 100.

FIGS. 17 and 18 are enlarged section views of mounting lug 114 depicting its attachment to primary extension 108 through the use of a tongue-and-groove arrangement 116, which is illustrated in section view in FIG. 19. As illustrated, lug 114 is free to traverse backward and forward along a portion of the length of extension 108 generally between hinge 110 and the joint between extension 108 and frame (102 in FIG. 1). As shown in FIG. 18, a coil spring 118 or similar biasing member may be provided in groove 116 to urge lug 114 rearward (toward hinge 110 and away from primary lenses (106 in prior FIGURES).

Figure 20:
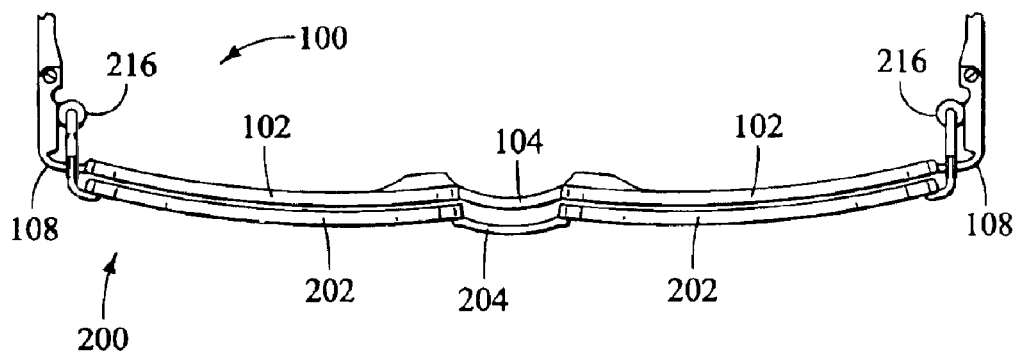
FIGS. 20 and 21 are plan views of the primary and auxiliary frame and lens assemblies illustrating the effect of the spring-loaded attachment point between them.
Figure 21:
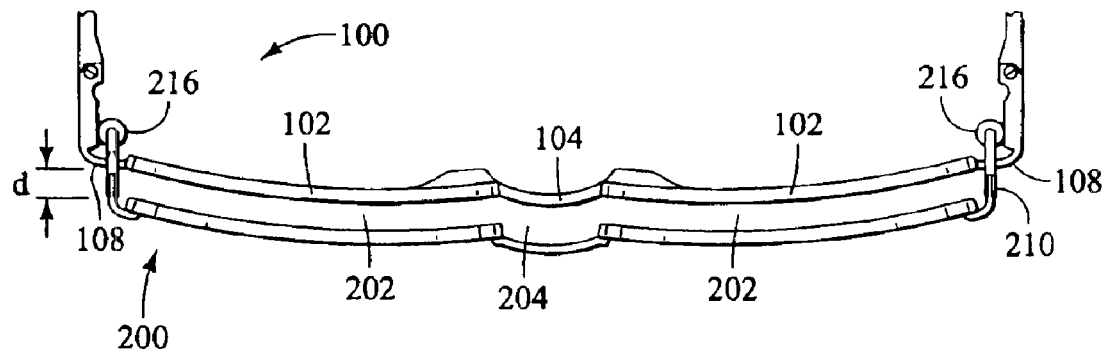

FIGS. 20 and 21 illustrate the ability of lug 114 to translate back and forth (fore and aft) relative to extension 108 (and the remainder of primary assembly 100) also permits auxiliary assembly 200 (which is secured to primary assembly 100 through lug 114 as described above) to translate or move back-and-forth relative to primary frame 100 a distance d that corresponds to the distance that lug moves in tongue-and-groove as shown above in connection with FIGS. 17 through 19.

In operation, auxiliary frame assembly 200 is secured to primary frame assembly 100 simply by engaging the end of hinge extension 214 with lug 114. This temporarily and removably secures the two together. By provision of a hinge 210 in auxiliary extension 208, auxiliary lens assembly 200 may be rotated between raised and lowered positions relative to primary lens assembly 100, thereby providing "flip-up" capability.

In a preferred embodiment, the primary lenses (held in primary frame 102) are corrective lenses and the auxiliary lenses (held in auxiliary frame 202) are light transmission reducing lenses, for example, a polarizing, absorbing, refracting, photochromatic, or reflecting lenses, or any combination thereof (i.e., sunglasses). In a preferred embodiment, the primary lenses are impact resistant safety lenses and the auxiliary lenses are light transmission reducing lenses, such as welding lenses. In another preferred embodiment, the primary lenses are corrective lenses and the auxiliary lenses are impact resistant safety lenses.

The eyewear assembly according to the present invention has a number of advantages. The principal advantage is that the attachment mechanism between the primary and auxiliary lens assemblies is relatively simple in manufacture and operation, yet positively secures the two together. This saves cost to the eyewear purchaser and wearer and reduces the number of pairs of eyewear the wearer must account for as a result of breakage of flimsy or poorly constructed eyewear. Moreover, the ability of auxiliary assembly 200 to move fore and aft relative to primary assembly 100' insures that auxiliary assembly 200 will not interfere with primary assembly 100 when it is rotated between the raised and lowered positions. This frees the eyewear designer to place the extensions (10B, 208) in a broader range of locations along the perimeter of the frames and to use a broader range of lengths for the extensions without causing interference between the two assemblies in operation.

The invention has been described with reference to a preferred embodiment thereof. It is thus not limited, but is susceptible to variation and modification without departing from the scope and spirit of the invention.

I claim:

1. An eyewear assembly comprising:
   a primary lens assembly including a primary frame that secures a pair of primary lenses in position relative to one another;
   a pair of primary extensions, each positioned on an outer periphery of the primary frame;
   a pair of arms, each connected to one of the primary extensions by a hinge;
   an auxiliary lens assembly including an auxiliary frame that secures a pair of auxiliary lenses in position relative to one another;
   a pair of auxiliary extensions, each positioned on an outer periphery of the auxiliary frame; and
   a lug carried between each of the primary and auxiliary extensions, wherein the lug removably secures the auxiliary lens assembly to the primary lens assembly, the lug being movable relative to the primary lens assembly, wherein the auxiliary lens assembly is movable a selected distance from the primary lens assembly.

2. The eyewear assembly according to claim 1, wherein the lug is secured by a tongue and groove to each of the primary extensions and is movable the selected distance toward and away from the primary lens.

3. The eyewear assembly according to claim 2, further comprising a biasing member disposed between the lug and the primary extension to urge the lug toward the primary lens.

4. The eyewear assembly according to claim 1, wherein the primary lenses are corrective lenses.

5. The eyewear assembly according to claim 1, wherein the primary lenses are corrective lenses.

6. An eyewear assembly comprising:
   a primary lens assembly including a primary frame that secures a pair of primary lenses in position relative to one another;
   a pair of primary extensions, each positioned on an outer periphery of the primary frame;
   a pair of arms, each connected to one of the primary extensions by a hinge;
   an auxiliary lens assembly including an auxiliary frame that secures a pair of auxiliary lenses in position relative to one another;
   a pair of auxiliary extensions, each positioned on an outer periphery of the auxiliary frame; and
   a lug carried on each of the primary extensions and movable on and relative to the extension, each lug adapted to receive a portion of one of the pair of auxiliary extensions, wherein the auxiliary lens assembly is removably secured to the primary lens assembly and the auxiliary lens assembly moves with the lugs.

7. The eyewear assembly according to claim 6, wherein the lug is secured by a tongue and groove to each of the primary extensions and is movable a selected distance toward and away from the primary lens.

8. The eyewear assembly according to claim 7, further comprising a biasing member disposed between the lug and the primary extension to urge the lug toward the primary lens.

* * * * *